Nov. 17, 1970

KEIZO SHIMANO ET AL 3,540,309

FRONT CHAIN SPROCKET HAVING A BUILT-IN
AUTOMATIC SPEED CHANGE MECHANISM

Filed Nov. 20, 1968

INVENTORS
KEIZO SHIMANO,
MASASHI NAGANO and
KIMIHIRO FURUKAWA

BY Wenderoth, Lind & Ponack

ATTORNEYS

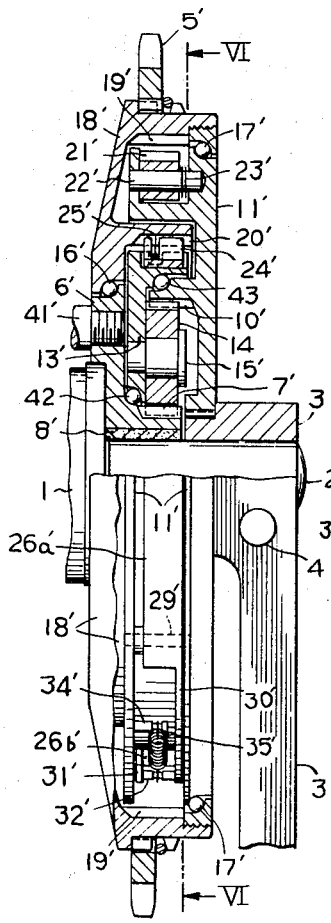
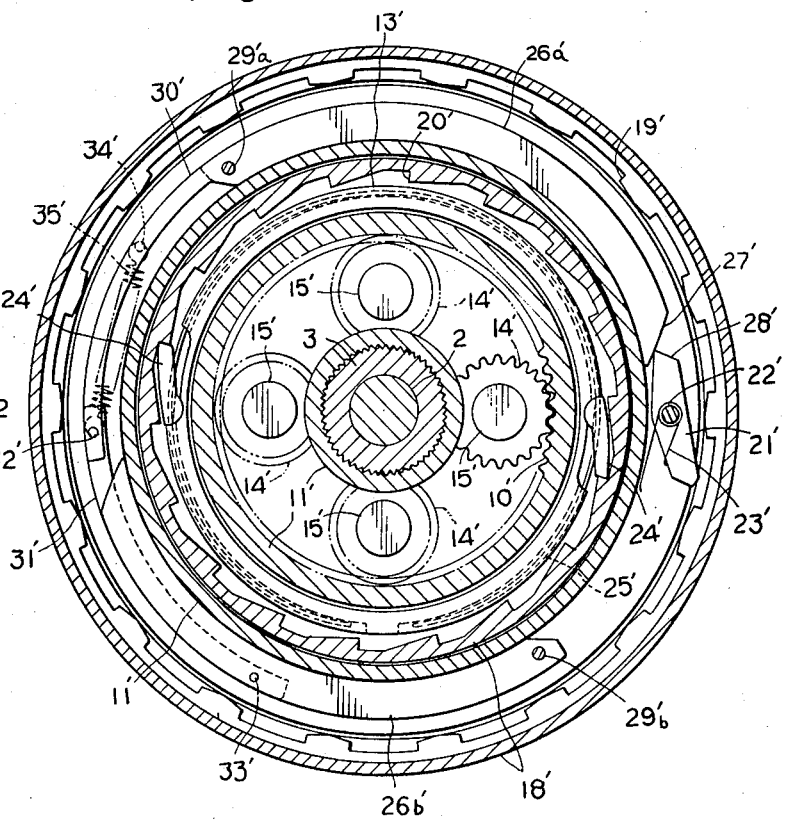

United States Patent Office 3,540,309
Patented Nov. 17, 1970

3,540,309
FRONT CHAIN SPROCKET HAVING A BUILT-IN AUTOMATIC SPEED CHANGE MECHANISM
Keizo Shimano, Masashi Nagano, and Kimihiro Furukawa, Sakai, Osaka, Japan, assignors to Shimano Kogyo Kabushiki Kaisha, Osaka, Japan
Filed Nov. 20, 1968, Ser. No. 777,268
Claims priority, application Japan, Dec. 2, 1967, 42/77,312
Int. Cl. F16h 5/42; B62m 11/14
U.S. Cl. 74—752    5 Claims

ABSTRACT OF THE DISCLOSURE

A front chain sprocket having a built-in automatic speed change mechanism for a bicycle is equipped with two kinds of speed-ratio transmission ratchet gearings, one of which is arranged to directly transmit rotation of pedal cranks to a chain sprocket carrier and hence to said front chain sprocket therethrough, the other of which is driven through a planetary gear mechanism. Either of the two is associated with centrifugal governor weights for bringing into or out of operative engagement of the high speed-ratio transmission ratchet gearing. The novel feature resides in providing the speed change mechanism of the abovementioned type to the front chain sprocket for the bicycle.

---

It has been proposed a rear hub having a built-in automatic multistage speed change mechanism responsive to a driving speed of a bicycle. However, because of a smaller diameter of the rear hub, it is absolutely necessary for centrifugal governor weights incorporated within said speed change mechanism for detecting the driving speed of the bicycle to be of diminished size and light in weight. This means each governor weight to be apparently small in its radius of gyration so that the governor weights are susceptible to influences of many factors. Therefore, in the above type of the speed change mechanism it is not possible to effect reliable change-over operation of the speed-ratio.

For the purpose of increasing the radius of gyration of the centrifugal governor weights, it has been further proposed a rear hub having an exposed speed change mechanism for a bicycle, of which a multistage free wheel assembly is equipped with a built-in automatic multistage speed change mechanism. In the bicycle with the rear hub of the abovementioned type, however, when a driving chain is engaging with a high speed sprocket wheel the change-over of the speed-ratio will be effected during relatively low speed rotation of pedal cranks, while in case of the driving chain being engaged with a low speed sprocket wheel, the change-over of the speed-ratio will be effected with the condition that the cranks are rotated at a relatively high speed. Thus, the change-over of the speed-ratio is very often unexpectedly effected to the discomfort of the bicycle operator.

It accordingly is an object of the invention to provide a front chain sprocket having a built-in automatic speed change mechanism for a bicycle, in which change-over of the speed-ratio is adapted to be automatically accomplished when the pedal cranks have attained a certain speed, and centrifugal governor weights are increased in size and in radius of gyration thereof.

Other objects and advantages of the present invention will be apparent from the following description, taken with the accompanying drawings in which similar reference numerals denote corresponding parts throughout the several views.

FIG. 5 is a plan view, partly broken away and in section, of another embodiment of the invention; and FIG. 6 is a cross sectional view taken along line VI—VI of FIG. 5.

Figure 3:
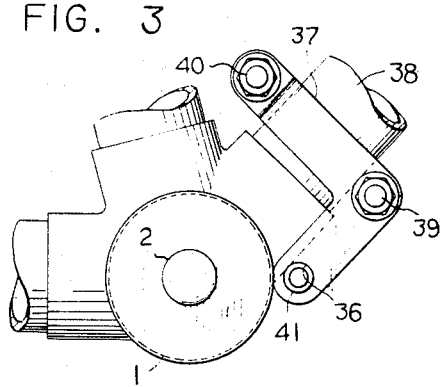
FIG. 3 is a side elevational view illustrating means for securely mounting a sun gear, with a right crank, a chain sprocket, etc., being omitted for the purpose of simplification.

Referring now to FIGS. 1-4, there is illustrated one embodiment of this invention, wherein a bicycle driving is started under low speed-ratio transmission condition, i.e. the direct transmission route. A bracket lug 1 carries a bracket axle 2 having a right crank 3 and a left crank (not shown) securely mounted thereon by means of a crank cotter pin 4. A chain sprocket 5 is adapted to be so associated with the cranks that forward rotation of the cranks (in the clockwise direction in FIG. 2) is accompanied by rotating the chain sprocket 5 in the same direction as will be hereinafter mentioned. Around the chain sprocket 5, there is a driving chain (not shown) connecting with a rear sprocket wheel on a rear hub (not shown), thereby driving the bicycle. As thus far described, the structure is substantially conventional.

As will be seen from FIG. 1, a sun gear 7 formed at the left-hand end with a flange portion 6 acting as an inner race cone is mounted on the bracket axle 2 through a suitable bearing, such as an oilless bearing 8, in a non-rotatable manner as hereinafter mentioned. An internal gear carrier body 11 is formed with a left-hand annular member 9 and an internal gear 10 on the inner wall thereof, the internal gear 10 being in indirect engagement with the sun gear 7, the annular member 9 being rotatably carried by means of a bearing 12 associated with said flange portion 6 of the sun gear 7. Between the sun gear and internal gear 7 and 10, there are a plurality of planetary pinions 14, each rotatably mounted on an axis 15 supported by a planet pinion cage 13, thereby forming a planetary gear mechanism. The planet pinion cage 13 is fixedly mounted on the boss portion projecting inwardly from the right crank 3 by means of spline engagement therewith.

Figure 1:
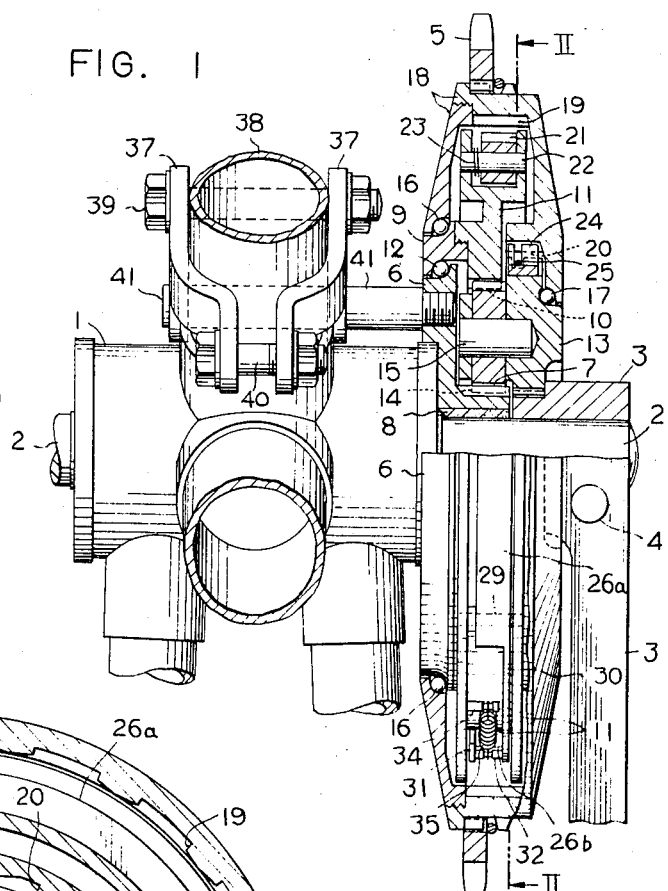
FIG. 1 is a plan view, partly broken away and in section, of a preferred embodiment of the invention, parts being shown under low speed-ratio transmission condition.
Figure 2:
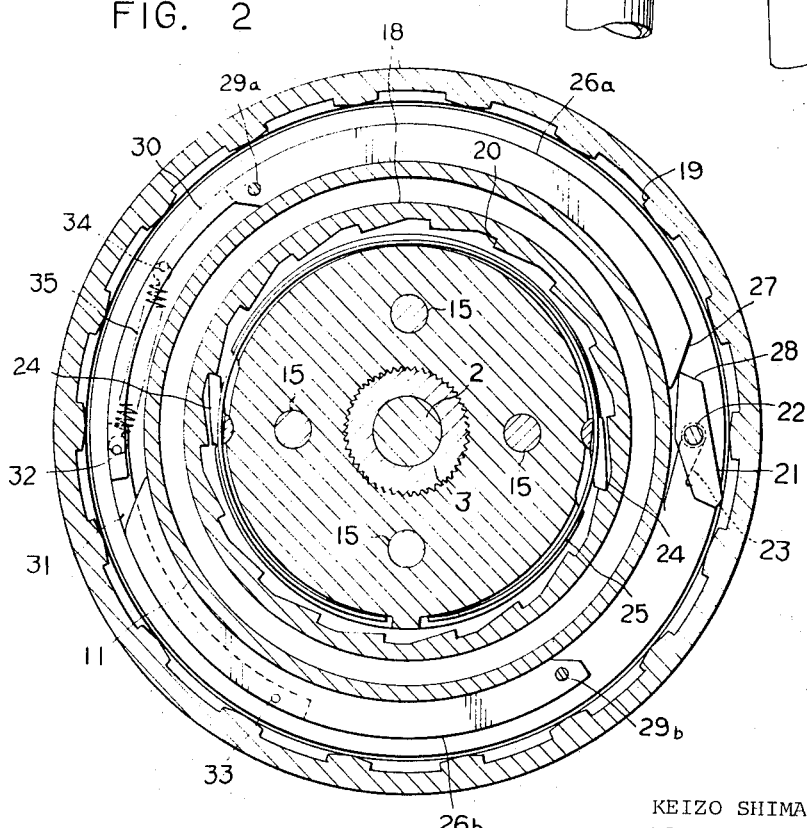
FIG. 2 is a cross sectional view taken along line II—II of FIG. 1.
Figure 4:
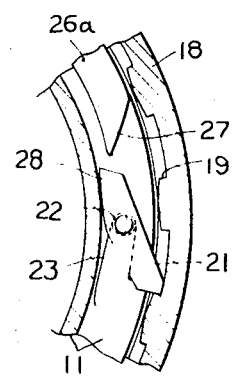
FIG. 4 is a fragmentary cross sectional view of the essential parts corresponding to those of FIG. 2, but the parts being shown under high speed-ratio transmission condition.

As shown in FIG. 1, a chain sprocket carrier 18 is substantially of a hollow disc-shape and surrounds said planetary gear mechanism comprising the fixed sun gear 7, the internal gear 10, the planetary pinions 14 and the planet pinion cage 13. Said chain sprocket carrier 18 is journalled at the left-hand portion on the annular member 9 by means of a bearing 16 and at the right-hand portion on the planet pinion cage 13 by means of a bearing 17. On the outermost surface of the chain sprocket carrier 18, there is fixedly mounted said chain sprocket 5 in a usual manner, while on the inner surface thereof, there are formed internal ratchet wheels 19 and 20 at the midmost portion and at the right-hand portion, respectively. The internal gear carrier body 11 is provided with a circumferentially surrounding groove defined by laterally spaced annular flanges which together appear forklike in transverse cross-section, and within which a pawl 21 for high speed driving is oscillatably mounted by means of a pivot 22. The driving pawl 21 is biased by a spring 23 mounted on the pivot 22 in the direction for bringing its tip into operative engagement with the internal ratchet wheel 19, thereby forming a high speed-ratio transmission ratchet gearing. On the planet pinion cage 13, there are mounted pawls 24 for low speed driving which are biased by a spring 25 in the direction for bringing the tips thereof into operative engagement with the internal ratchet wheel 20, thereby forming a low speed-ratio transmission ratchet gearing for connecting the planet pinion cage 13 with the chain sprocket carrier 18. Within said circumferentially surrounding forklike portion or space of the internal gear carrier body 11, there are futher a main and an auxiliary centrifugal governor weights 26a and 26b, respectively, of arcuate shape and oscillatably mounted as at 29a and 29b. Said governor weights are arranged in symmetrical relation with respect to the axis of the bracket axle 2, and so arranged that the arcuate abutting face 27 at the tip of the main governor weight 26a is facing to the tail 28 of the pawl 21 for high speed driving. The tail end 30 of the main governor weight 26a is connected to the auxiliary governor weight 26b by means of a link 31 linked by pivots 32 and 33, so that both governor weights 26a and 26b may be simultaneously oscillated outwardly or inwardly. This allows the governor weights 26a and 26b to be actuated without any error in operation even though these governor weights being vibrated may vibrate due to movement of the bicycle. A spring 35 is stretched between the pivot 32 on the tail end 30 and a hook 34 planted in the internal gear carrier body 11, thereby to give a tendency of normally pulling the tips of the governor weights 26a and 26b toward the axis of the bracket axle. Thus, so far as the speed of rotation of the internal gear carrier body 11 is lower than a predetermined speed, the governor weights 26a and 26b are held oscillated inwardly toward the axis of the bracket axle against the action of centrifugal force, and the tail 28 of the pawl 21 for high speed driving is held abutting against the abutting face 27 of the main governor weights 26a, so that the tip of the pawl 21 will be brought out of operative engagement with the internal ratchet wheel 19. On the contrary, when the speed of rotation of the internal gear carrier body 11 is increased above said predetermined speed, the governor weights 26a and 26b will be oscillated outwardly against the action of said spring 35, whereby the tail 28 of the pawl 21 for high speed driving will be automatically released from the main governor weight 26a, so that the tip of the pawl 21 will be brought into operative engagement with the ratchet wheel 19 (FIG. 4).

When the speed of rotation of the internal gear carrier body 11 or of the cranks 3 is comparatively low, for instance at the start of driving the bicycle, the high speed-ratio transmission ratchet gearing is in inoperative position, and the rotation of the cranks is transmitted to the chain sprocket carrier 18 through the planet pinion cage 13, the pawls 24 for low speed driving, and the internal ratchet wheel 20, that is, through the direct transmission route. When the speed of rotation of the cranks is increased and the governor weights 26a and 26b are oscillated outwardly against the action of the spring 35 with the consequence that the pawl 21 for high speed driving is brought into operative engagement with the internal ratchet wheel 19, the rotation of the cranks is transmitted to the chain sprocket carrier 18 through the planet pinion cage 13, the planetary pinions 14, the internal gear 10, the internal gear carrier body 11, the pawl 21 for high speed driving and the internal ratchet wheel 19, that is, through the increased speed-ratio transmission route. Under such high speed-ratio transmission condition, the pawls 24 for low speed driving are in operative engagement with the internal ratchet wheel 20, but the planet pinion cage 13 provided with the pawls 24 will rotate at speed higher than the chain wheel carrier 18, so that it is not substantially effective.

As will be apparent from FIGS. 1 and 3, there are a pair of brackets 37 of L-shape fixedly mounted on a down tube 38 by means of fitting screws 39 and 40. Each bracket is provided at its one end with a hole 36 into which an arm 41 projecting from the inner race cone 6 is securely fitted to restrain the sun gear 7 from rotation.

Referring now to FIGS. 5-6, there is illustrated another embodiment of this invention, wherein a bicycle driving is started under low speed-ratio transmission condition, that is, the decreased speed-ratio transmission route. A sun gear 7' formed at the lefthand end with a flange portion 6' acting as an inner race cone is carried by means of an oilless bearing 8' fitted onto a bracket axle 2, the sun gear 7' being held stationary in a manner as in the previous embodiment. An internal gear carrier body 11' of a disc-shape is splined to a right crank 3 and provided with an internal gear 10'. Between the sun gear 7' and internal gear 10', there are a plurality of planetary pinions 14' in operative engagement with said sun gear 7' as well as said internal gear 10', each pinion 14' being rotatably mounted on an axis 15' supported by a planet pinion cage 13', thereby forming a planetary gear mechanism. The planet pinion cage 13' is carried by means of bearings 42 and 43.

As shown in FIG. 5, a chain sprocket carrier 18' is substantially of F-section, and is associated at the leg portion thereof with the inner race cone 6' through a bearing 16' and at the upper portion with the internal gear carrier body 11' through a bearing 17' in a manner that said planetary gear mechanism is surrounded thereby. On the outermost surface of the chain sprocket carrier 18', there is fixedly mounted a chain sprocket 5' in a usual manner, while on the inner surface there are formed internal ratchet wheels 19' and 20'. The internal gear carrier body 11' is provided in its circumferential groove with a pawl 21' for high speed driving oscillatably mounted thereon by means of a pivot 22'. The driving pawl 21' is biased by a spring 23' wound around the pivot 22' in the direction for bringing its tip into operative engagement with the internal ratchet wheel 19', thereby forming a high speed-ratio transmission ratchet gearing for operatively connecting the internal gear carrier body 11' with the chain sprocket carrier 18'. On the planet pinion cage 13', there are mounted pawls 24' for low speed driving which are biased by a spring 25' in the direction for bringing the tips thereof into operative engagement with the internal ratchet wheel 20', thereby forming a low speed-ratio transmission ratchet gearing for operatively connecting the planet pinion cage 13' with the sprocket wheel carrier 18'. Within said circumferential groove of the internal gear carrier body 11', there is further an automatic control mechanism for the high speed driving pawl 21', comprising a main and an auxiliary centrifugal governor weights 26a and 26b and others. Said automatic control mechanism is of the same construction as that of the previous embodiment and need not be further described.

As the arrangement is constructed as hereinbefore mentioned, in operation, when the speed of rotation of the internal gear carrier body 11' or of the cranks 3 is comparatively low, for instance at start of driving the bicycle, the high speed-ratio transmission ratchet gearing is in inoperative position, and the rotation of the cranks is transmitted to the chain sprocket carrier 18' through the internal gear carrier body 11', the internal gear 10', the planetary pinions 14', the planet pinion cage 13' and the internal ratchet wheel 20', that is, through the decreased speed-ratio transmission route. When the speed of rotation of the cranks is increased with the consequence that the pawl 21' for high speed driving is brought into operative engagement with the internal ratchet wheel 19', the rotation of the cranks is transmitted to the chain sprocket carrier 18' through the internal gear carrier body 11', the pawl 21' for high speed driving and the internal ratchet wheel 19', that is, through the direct or increased speed-ratio transmission route. Under such high speed-ratio transmission condition, the pawls 24' for low speed driving are in operative engagement with the internal ratchet wheel 20', but the planet pinion cage 13' with the pawls 24' will rotate at speed lower than the chain sprocket 18', so that the internal ratchet wheel 20' is not substantially effective.

With respect to the aforementioned two embodiments of this invention, if the driving speed is decreased under the high speed-ratio transmission condition, then the centrifugal governor weights will be returned to the initial inwardly oscillated position. But, the high speed-ratio driving ratchet gearing would not be released merely by the fact that the tip of said main governor weight has been pushed against the tail end of the high speed driving pawl. For the purpose of releasing such operative engagement, the bicycle driver must temporarily cease from pedalling the bicycle or must pedal in backward direction, whereby the high speed driving pawl and the high speed ratchet wheel, forming a part of the high speed-ratio transmission ratchet gearing are rotated in the reverse direction with each other, so that the high speed driving pawl is released from the high speed ratchet wheel, allowing the tail end suppressed by the abutting face of the main governor weight. Thus, the change-over from high speed-ratio to low speed-ratio transmission condition cannot be effected against the will of the bicycle driver, so that it is possible to prevent occurrence of a disagreeable repetition of change-over between low speed-ratio and high speed-ratio transmission conditions. In the event that the bicycle is at a stop, since the driver has already ceased pedalling before the bicycle is stopped, the driver can start driving of the bicycle normally with the low speed-ratio transmission condition.

From the foregoing it will be seen, according to the present invention, that the speed change mechanism comprises a chain sprocket carrier, a planet pinion cage, a first ratchet gearing for transmitting rotation of said planet pinion cage to said chain sprocket carrier through direct transmission route, a planetary gear mechanism for speed change, a second ratchet gear for transmitting rotation of said planetary gear mechanism, and centrifugal governor weights for bringing into or out of operative engagement of the high speed-ratio ratchet gearing, the arrangement being such that the bicycle driver may normally start driving under the low speed-ratio transmission condition, and upon increase of driving speed the transmission condition may be changed over to the high speed-ratio transmission condition. It will also be seen that as rotation of the planet pinion cage is transmitted to the front sprocket wheel through the ratchet gearing, a sprocket wheel (or wheels) mounted on a rear hub is not required to be formed as a free wheel.

Although two specific embodiments have been described above, it will be readily understood by those skilled in the art that various rearrangements of parts and modifications of parts may be accomplished without departing from the spirit and scope of the invention as defined in the appended claims.

What we claim is:

1. An automatic speed change mechanism for a bicycle utilizing an improved front chain sprocket means wherein the combination comprises:
   (a) a rotatable axle having at its both ends pedals of the bicycle;
   (b) a driven member carrying and rotatable with said front chain sprocket about said axle; and
   (c) a two-ratio lower gear speed and higher gear speed change speed mechanism disposed within said driven member, said mechanism including:
      (1) a planetary gear mechanism comprising a sun gear arranged around said axle, a plurality of planetary pinions engaging said sun gear, an internal gear engaging said pinions, and a planet pinion cage;
      (2) means for preventing rotation of said sun gear;
      (3) a driving member rotatably connected with the pedals;
      (4) a first resiliently-biased pawl and first annular ratchet gearing for cooperatively connecting said driving member to said driven member during higher pedal speed rotations;
      (5) a second resiliently-biased pawl and second annular ratchet gearing of smaller diameter for cooperatively connecting said planetary gear mechanism to said driven member during lower pedal speed rotation;
      (6) said pawls respectively having opposite tail and tip ends, and
      (7) centrifugal governor means for effecting engagement and disengagement of one of said first and second ratchet gearings responsive to variation in speed of the pedals, said one being for the higher gear speed.

2. A bicycle change speed mechanism as defined in claim 1, wherein said means for preventing rotation of said sun gear comprises an arm fixedly secured to said gun gear, bracket means fixedly secured to said arm, and means for clamping said bracket means to a bicycle frame.

3. A bicycle change speed mechanism as defined in claim 1, wherein said centrifugal governor means includes a generally arcuately and oscillatably disposed main governor weight having an abutting face and means to arcuately dispose it normally radially inwardly of the tail of said pawl of said first pawl and ratchet gearing as to force its pawl tip out of engagement with a ratchet tooth during driving at a low speed of the pedals in which said two-ratio change speed mechanism is in the low gear speed, and disposed so said main governor weight is oscillated outwardly when driving at a higher speed in which said two-ratio change speed mechanism is in the higher gear speed, resulting in said main governor weight being disengaged from said tail of the first pawl thereby to allow the tip of said pawl to bias into engagement with a ratchet tooth of said corresponding first annular ratchet gearing.

4. An automatic speed change mechanism for a bicycle utilizing an improved front chain sprocket means wherein the combination comprises:
   (a) a rotatable axle having at its both ends pedals of the bicycle;
   (b) a driven member carrying and rotatable with said front chain sprocket about said axle; and
   (c) a two-ratio high and low change speed mechanism disposed with said driven member, said mechanism including:
      (1) a planetary gear mechanism comprising a non-rotatable sun gear, a planet pinion cage fixedly mounted on said axle, a plurality of planetary pinions carried for rotation by said planet pinion cage, and an internal gear engaging said planetary pinions, said sun gear and said planet pinion cage carrying said driven member;
      (2) a resiliently-biased, first pawl and related first annular ratchet gearing cooperatively connecting said planet pinion cage to said driven member,
      (3) a similar second pawl and ratchet gearing of greater diameter than said first ratchet gearing for cooperatively connecting said internal gear to said driven member, and
      (4) centrifugal governor means mounted to said internal gear to effect engagement and disengagement of said second pawl with said related ratchet gearing according to predetermined variation in pedal rotation speed.

5. An automatic speed change mechanism for a bicycle utilizing an improved front chain sprocket means wherein the combination comprises:
   (a) a rotatable axle having at its both ends pedals of the bicycle;
   (b) a driven member carrying and rotatable with said front chain sprocket about said axle, and
   (c) a two-ratio change speed mechanism disposed within said driven member, said mechanism including:
      (1) a planetary gear mechanism comprising a non-rotatable sun gear, a plurality of planetary pinions engaging said sun gear, a planet pinion cage carrying for rotation said planetary pinions, and an internal gear engaging said planetary pinions,
(2) a driving member rotatable at the same speed as the pedals and formed with said internal gear,
(3) a resiliently-biased, first pawl and related first annular ratchet gearing for cooperatively connecting said driving member to said driven member,
(4) a similar second pawl and related second ratchet gearing connecting said planet pinion cage to said driven member, and
(5) centrifugal governor means mounted to said driving member to effect engagement and disengagement of said first pawl with said related ratchet gearing according to predetermined variation in pedal rotation speed.

References Cited

UNITED STATES PATENTS

| 1,526,949 | 2/1925 | Barenyi | 74—752 |
| 2,910,157 | 10/1959 | Gleasman | 74—750 X |
| 3,143,005 | 8/1964 | Schwerdhofer | 74—752 |

FOREIGN PATENTS

| 625,502 | 8/1961 | Canada. |
| 1,348,324 | 11/1963 | France. |
| 148,463 | 1/1955 | Sweden. |
| 245,261 | 7/1947 | Switzerland. |

MARK NEWMAN, Primary Examiner

T. C. PERRY, Assistant Examiner

U.S. Cl. X.R.

280—260